Feb. 26, 1963 W. ZORN 3,078,761
FLASHLIGHT HAVING PROJECTION POINTER
Filed Jan. 26, 1959 2 Sheets-Sheet 2

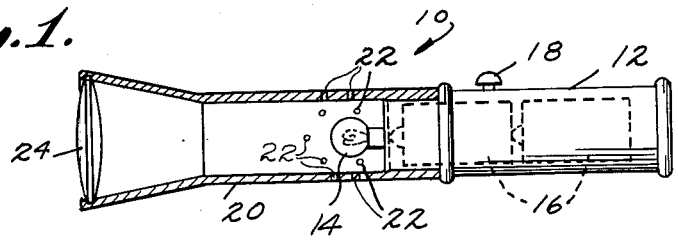

INVENTOR
WERNER ZORN
BY Cushman, Darby & Cushman
ATTORNEYS 3,078,761
FLASHLIGHT HAVING PROJECTION POINTER
Werner Zorn, Schillerstrasse 5, Berlin-
Zehlendorf, Germany
Filed Jan. 26, 1959, Ser. No. 789,035
1 Claim. (Cl. 88—24)

This invention relates to illumination devices and particularly to an illumination device constructed and arranged to project a light beam of predetermined configuration, such as an arrow, ring, cross or the like, to assist in lectures or the like given in dark rooms and in conjunction with lantern-slide projectors. As will be understood, the arrow, ring, cross or the like issuing from the illumination device will be projected onto the screen by the lecturer or an assistant to focus the viewer's attention on the desired location in the picture appearing on the screen from the lantern-slide projector.

Illumination devices contemplated by the invention preferably are of a size adapted to be conveniently handled by the lecturer, such as the size of a flashlight. They may be constructed to receive electric energy from batteries contained therewithin, or they may be connected to an external source of current by suitable wiring, as desired.

In connection with the use of these illumination devices, which will hereinafter sometimes be designated "electric pointers," for convenience, it will be appreciated that they should be turned off immediately after use so that the life of the electric bulb therewithin and the batteries, if such are used, will not be unnecessarily shortened. Due to the nature of the electric pointers contemplated, the lecturer will only notice the light from the electric pointer when the beam therefrom lights up objects which are near to him or in his field of vision. Thus, the fact that the electric pointer is still on, when not being used, may go unnoticed unless some additional means are provided. Understandably, this is a condition which should be avoided.

Occasionally, it becomes necessary or desirable for the lecturer to read from books or other literature during the lecture period. For this purpose, some extra lighting is needed, and this extra lighting preferably should be of such character as not to illuminate the entire room, whereby undue strains on the eyes, such as would occur if the lights for the room were turned on and off at frequent periods during the lecture, will be avoided.

Accordingly, it is an important object of the invention to provide a novel electric pointer adapted to enable the user to more readily determine whether the pointer is on or off, when not in use, and also adapted to be conveniently used in a dark room for reading purposes, while involving a minimum of illumination.

In accordance with the embodiments of the invention, to be described hereinafter in greater detail, the invention contemplates a source of light, a tubular member surrounding said source of light and extending outwardly therefrom, means for directing the light issuing from said source into a beam of light of predetermined character to act as a pointer, and means for transmitting light from said source generally laterally through said tubular member adjacent said source. The aforesaid means for transmitting light preferably are in the form of apertures provided in the tubular light member adjacent to the source of light. It is also contemplated that means be provided for partially or completely closing off these apertures, as desired.

Thus, with such an arrangement, if the electric pointer is on, when not being used, the lecturer will notice this condition by reason of the light projecting from the small aperture.

The invention also contemplates that means be arranged in the electric pointer to optionally direct substantially the entire light issuing from the bulb or source of light laterally through a reading aperture adjacent to the bulb, when the device is being used as a reading lamp, to keep the attention of the audience from being diverted by the arrow, ring, cross or similar character normally projected from the electric pointer.

The tubular member referred to above may be constructed of any suitable material and may be transparent or opaque or any degree of transparency therebetween. If a transparent material is used for the tubular member, the light apertures referred to may be formed by partially covering the tubular member on the inner or outer surface thereof wtih an opaque material, except for the regions defining the apertures. In this case, the apertures will not in fact be holes through the tubular member, but will be circular transparent regions not coveerd by the opaque material. By choosing the appropriate degree of transparency of the tubular member, a greater or lesser degree of brilliance of the light issuing from the apertures can be obtained.

The external surface of the electric pointer may be made so as to be partially or completely luminescent whereby the pointer, whether on or off, will be visible in a dark room.

Further objects and advantages of the invention will be in part obvious and in part pointed out hereinafter.

The novel features of the invention may be best made clear from the following description and accompanying drawings in which:

FIGURE 1 is an elevational view, partly in vertical section, illustrating an electric pointer constituting one embodiment of the invention;

FIGURE 2 is an elevational view of an electric pointer constituting another embodiment of the invention;

FIGURE 3 is an elevational view of still another embodiment of the invention;

FIGURE 4 is a view corresponding to FIGURE 1 and showing a further embodiment of the invention;

Figure 5:
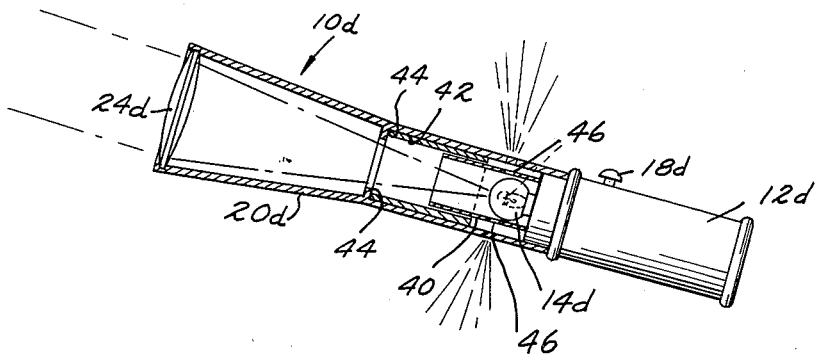
FIGURE 5 is a view corresponding to FIGURE 1 and showing an additional embodiment of the invention, the electric pointer being disposed in operative position for identifying locations on a screen.

Referring now to FIGURE 1, the electric pointer of the invention illustrated in this figure is identified by numeral 10 and comprises a battery container 12 having a source of light 14 constituting the arrow or ring lamp and appropriately secured at one end to the container 12, as shown. Batteries 16 may be provided in the container 12, as indicated, and a switch 18 will be provided for turning the pointer on or off. The switch 18 may be of any conventional variety, such as the type commonly employed for use with the batteries of a flashlight.

A tubular member or lens casing 20 is suitably engaged to the container 12 in the manner indicated, for example, by a friction fit, and may be of the configuration shown. A plurality of small apertures 22 are formed in this tubular member 20 adjacent the source of light 14, and a lens 24 is fitted into the tubular member adjacent the outer or free end thereof, as shown. As will be understood, this lens will be constructed and arranged to cooperate with the special bulb 14 to direct a beam of light of the predetermined character, e.g., an arrow, ring, cross or other appropriate character, onto a screen for identifying and locating purposes.

It will be evident that the apertures 22 will define points of light in the dark room to indicate that the pointer is on, as well as showing where the pointer is located in the darkened room.

FIGURES 2–6 show additional embodiments of the invention and similar reference numerals have been used throughout the several figures to identify similar parts.

The embodiment of FIGURE 2 is substantially the same as that of FIGURE 1, except that the tubular member 20a of FIGURE 2 is provided with a larger aperture 26 adjacent the source of light 14a. This aperture 26 is of a size to let enough light pass laterally from the lamp 14a to permit the user to use the pointer as a reading lamp. If desired, a transparent window of suitable material may be provided over the aperture 26 in order to subdue the light issuing therethrough. Other apertures, similar to those shown in FIGURE 1, may be provided around the tubular member 20a adjacent to the bulb 14a.

As indicated heretofore, the tubular member in the various embodiments may be of a transparent material, such as plastic, and may be covered with an opaque coating to prevent the emission of light laterally, except through the aperture or apertures adjacent the source of light. This opaque coating, for example, may be formed by applying an opaque paint or an opaque solid material to the inner or outer surface of the tubular member.

The embodiment illustrated in FIGURE 3 is also substantially identical to that shown in FIGURE 1, and includes an aperture 26b corresponding to the aperture 26 in FIGURE 2 as well as including a plurality of smaller apertures 22b formed in the tubular member adjacent the bulb 14b. An opaque slide 28 is arranged, for example, on the inside of the tubular member 20b, and is movable axially of the tubular member to open or close the reading aperture 26b. For this purpose, a slot 30 is shown as being provided in the tubular member, and the slide 28 includes a knob or the like 32 projecting through this slot and adapted to be engaged by a finger for moving the slide back and forth, as is apparent. In this embodiment, the arrangement of the apertures 22b is such that the position of the knob 32 will be at the point of intersection of the two rows of apertures 22b. Thus, the location of the knob may be easily found in the dark room.

FIGURE 4 illustrates a further embodiment of the invention substantially identical to that shown in FIGURE 2, except that means are provided for obstructing the light issuing from the bulb 14c toward the lens 24c, whereby the light will be directed substantially laterally through the aperture 26c. This means is shown as including a knife switch 34 suitably mounted for pivotal movement within the tubular member 20c and including a slide 36 at one end thereof. The other end of the switch 34 projects through an aperture 38 in the tubular member, as shown; the full line position of this switch operating to prevent the passage of light through the aperture 26c; while permitting light to be passed through this aperture, or any other smaller apertures that may be provided in the tubular member adjacent the lamp, when the switch 34 is in the dotted line position. When it is desired to use the pointer of this embodiment for reading, the switch 34 will be moved to the dotted line position thereof, whereby the opaque slide 36 will be in position to substantially or completely cut off the passage of light from bulb 14c to the lens 24c, while permitting light to pass through the reading aperture 26c. Additional apertures (not shown) may be provided in the tubular member 20c adjacent the bulb 14c, for example, in the manner indicated in FIGURES 1 or 3. The position of the switch 34 will be indicated by the light passing through the aperture 38.

Figure 6:
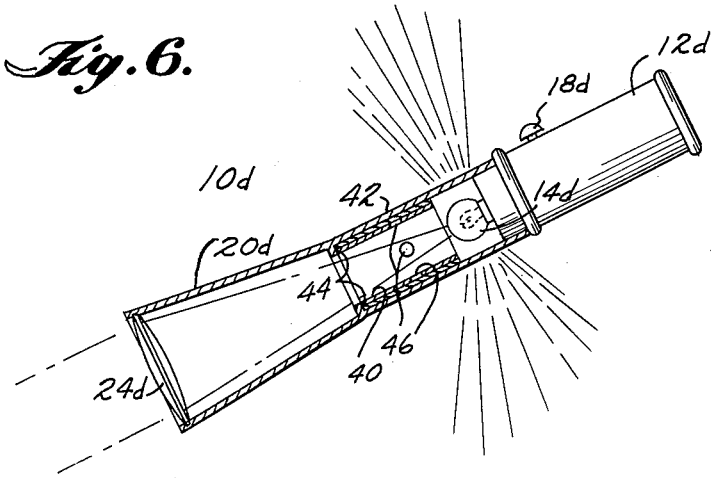
FIGURE 6 is a view corresponding to FIGURE 5, and showing the same embodiment of the invention in position to be used as a reading lamp.

FIGURES 5 and 6 indicate another embodiment of the invention, substantially identical to those just described, and including a tubular slide 40 of opaque material arranged within the tubular member 20d for sliding movement therewithin. The tubular member 20d, in this embodiment, is made of a transparent material, and is shown as being provided on its inner surface with an opaque coating 42. The tubular slide 40 is movable between an annular stop surface 44 provided within the tubular member 20d, and the end of the container 12d, as indicated. In the position shown in FIGURE 5, gravity has operated to draw the slide 40 to a position surrounding the source of light 14d, as indicated, whereby light will be projected through the lens 24d, and onto the screen. When it is desired to use the pointer of this embodiment for reading purposes, the same will be slanted, for example, to the position shown in FIGURE 6, whereby gravity will effect movement of the slide 40 to the position shown in FIGURE 6, and light will issue laterally through the transparent side walls of the tubular member 20d adjacent the source of light. The slide 40 may be provided with apertures 46 to indicate that the pointer is on when the slide is in the position shown in FIGURE 5.

The present invention will thus be seen to completely and effectively accomplish the objects enumerated hereinabove. It will be realized, however, that various changes and substitutions may be made to the specific embodiments disclosed herein for the purposes of illustrating the principles of this invention, without departing from these principles. Therefore, this invention includes all modifications encompassed within the spirit and scope of the following claim.

What is claimed is:

Device of the character described comprising: a flash light of elongated tubular construction and including a light source operative to emit a light beam of predetermined character to act as a pointer, a tubular member joined at its rearward end to said flash light and operative to emit light in a longitudinal path through its opposite forward end, said member including a focusing lens and including a light-emitting circumferential portion adjacent said light source; and an opaque cylindrical member mounted within said tubular member and movable by gravity longitudinally between a first position adjacent said circumferential portion in said tubular member whereby light transmission in a lateral direction is blocked and the light from said source is directed through the forward end of said tubular member, and a second longitudinally spaced position with respect to said circumferential portion whereby light is transmitted in a lateral direction.

References Cited in the file of this patent

UNITED STATES PATENTS

| 1,248,688 | Ludescher | Dec. 4, 1917 |
| 1,274,713 | Hoffman et al. | Aug. 6, 1918 |
| 1,360,575 | Pinto | Nov. 30, 1920 |
| 2,107,648 | Putterman | Feb. 8, 1938 |
| 2,357,542 | Pfeil | Sept. 5, 1944 |
| 2,764,058 | Ellis | Sept. 25, 1956 |
| 2,784,303 | Heiser | Mar. 5, 1957 |

FOREIGN PATENTS

| 169,761 | Austria | Dec. 27, 1951 |